Aug. 22, 1933.    W. H. GERSTENSLAGER    1,924,067
METHOD OF AND MACHINE FOR BUILDING BELTS
Filed March 25, 1930
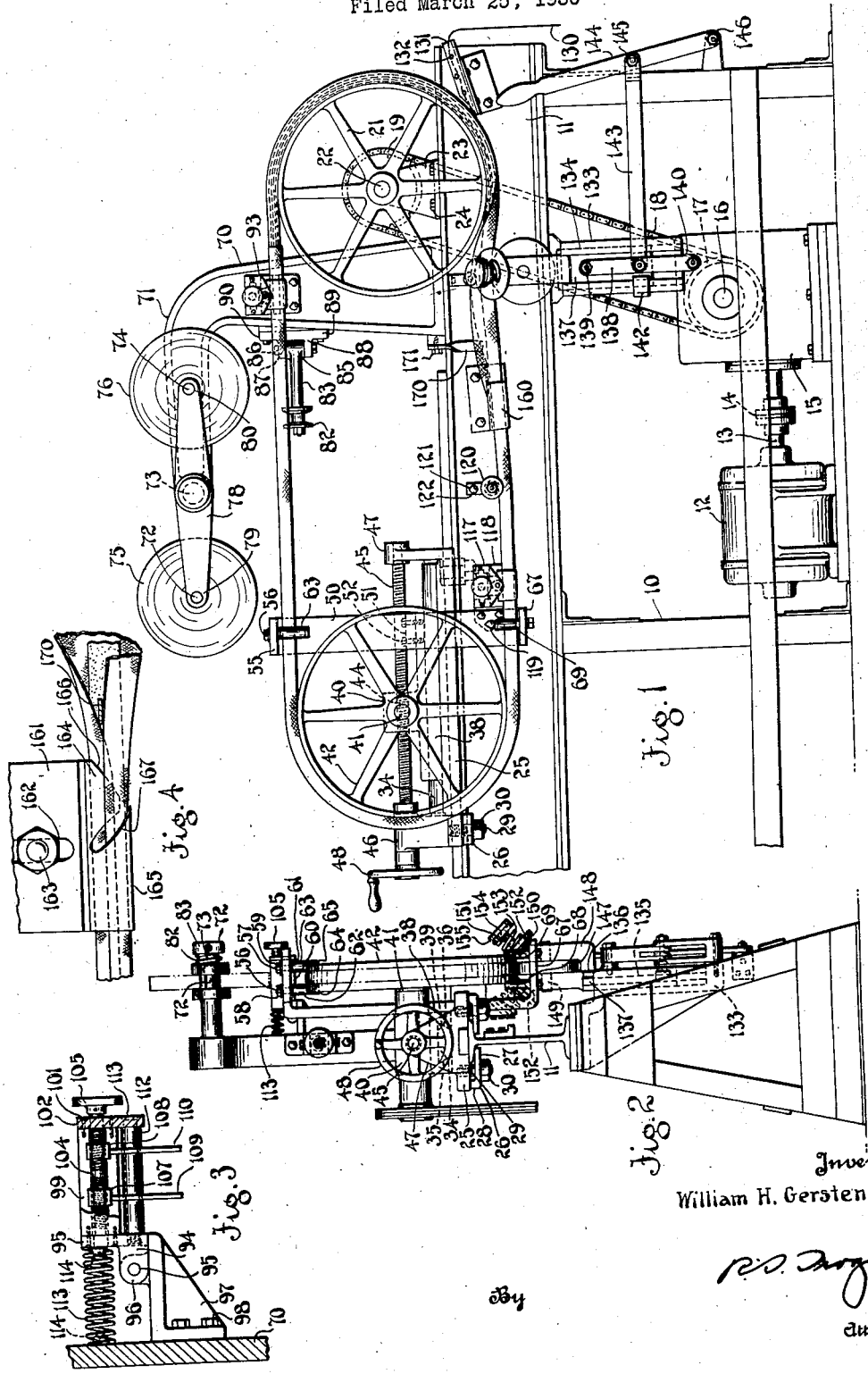
Inventor
William H. Gerstenslager
By
Attorney Patented Aug. 22, 1933

1,924,067

UNITED STATES PATENT OFFICE 1,924,067

METHOD OF AND MACHINE FOR BUILDING BELTS

William H. Gerstenslager, Akron, Ohio, assignor to The Goodyear Tire & Rubber Company, Akron, Ohio, a Corporation of Ohio Application March 25, 1930. Serial No. 438,771

19 Claims. (Cl. 154—4)

This invention relates to the manufacture of endless belts and it has particular relation to a machine for and a method of manufacturing so-called V-belts, or those having converging side surfaces.

An object of the invention is to provide a machine for assembling a plurality of plies of rubberized material which vary in width, substantially in accordance with the variances in width of the different layers of a finished V-belt.

Another object of the invention is to provide a machine for building V-belts particularly of large sizes, which is readily adjustable to accommodate belts of different cross-sectional dimensions and of different lengths.

Another object of the invention is to provide a machine for assembling the core of a V-belt and for applying a woven fabric cover thereto, without removing the core from the machine.

Another object of the invention is to provide a method of manufacturing V-belts by the employment of which, the several layers of material constituting the core of the belt, may be rapidly assembled, and a cover applied to such core, without removing the core from the machine.

V-belts of small sizes have been widely used and are standard equipment on motor vehicles for the purpose of driving fan belt pulleys. More recently, belts of this character have been constructed in larger sizes primarily for employment in multiple V-belt drives that are now being used in various manufacturing plants for transmitting power from one pulley to another. Various methods have been employed for manufacturing V-belts of the smaller sizes, one of which comprises winding wide strips of rubber and fabric about a collapsible drum and severing a band thus formed into narrow annular cores of substantially rectangular cross-section which are then individually covered with woven fabric, vulcanized, and molded to V-shape. While such a method may be employed for manufacturing larger sizes of V-belts it has been found more desirable to manufacture the latter in a different manner, and the present invention constitutes an efficient machine and method for effecting this purpose.

According to this invention, a pair of spaced pulleys is provided, at least one of which is so adjustable with respect to the other that belts of various lengths may be manufactured. Initially, a narrow strip of elongate fabric is wound about the pulleys while they are rotated, during which operation, guiding means retain the strip in a definite vertical plane. Other strips varying in width with respect to the first strip of fabric, then are wound about the latter until a core of desired dimensions is built up. During the winding of the last mentioned strips of fabric about the pulleys, means are employed for so guiding each strip that it is maintained in proper alignment with the first strip wound about the pulleys. The means for guiding the several strips is so adjustable that once the first strip is wound about the pulleys, each of the succeeding strips applied is precisely aligned with the latter. Consequently, all of the strips constituting the core of the belt are symmetric with respect to the median plane of the core. After the core is assembled, folding devices are operatively associated with the core, and an elongate strip of woven fabric is folded about the latter during a continuous movement thereof. The belt thus assembled is substantially of the shape desired in the finished belt, and it remains only to dispose the belt in a suitable grooved drum, and vulcanize it.

For a better understanding of the invention, reference may now be had to the accompanying drawing, forming part of this specification, in which:

Fig. 1 is a side elevational view of a machine constructed according to one form of this invention;

Fig. 2 is an elevational view of the machine shown by Fig. 1, taken from the left end thereof;

Fig. 3 is a view in detail on a larger scale, of a mechanism employed in the machine for guiding strips of fabric during the winding thereof about pulleys employed in the machine; and Fig. 4 is a fragmentary view, on a larger scale, of a device employed for folding a woven fabric cover about the core of the belt.

Referring to Figs. 1 and 2, a frame 10 is provided which supports an I-beam 11 extending the entire length of the frame. A motor 12, located at the base of the frame is provided with a shaft 13 which is operatively connected by a coupling 14 to a reduction gearing 15. A shaft 16 projecting from one side of the reduction gearing 15 is provided with a sprocket wheel 17 about which a chain 18 is trained. In turn the chain 18 is trained about a sprocket wheel 19 rigidly secured on one end of a shaft 22 journalled in a bearing bracket 23 secured by bolts 24 to the upper flange of the I-beam 11 adjacent one end thereof. The opposite end of the shaft 22 is rigidly secured to a pulley 21 having a cylindrical outer surface.

Adjacent the opposite end of the I-beam, a guide block 25 is rigidly, but adjustably mounted upon the upper flange of the I-beam by means of clamps 26, which have upwardly projecting arms 28 engaging the lower edge portions of the block, and laterally projecting arms 27 underlying the opposite edges of the upper flange of the I-beam. Stud bolts 29 projecting downwardly from opposite sides of the block at the edges of the flange of the I-beam project through openings in the clamps 26 and are provided with nuts 30 for rigidly securing the clamp against the lower side of the flange of the beam and thereby rigidly retaining the block upon the latter. The clamps 26 are disposed at opposite ends of the block and it is apparent that by loosening the nuts 30, the block can be moved longitudinally with respect to the beam and rigidly secured in any position desired.

A guide 34 integral with the block 25 and located upon the upper side of the latter is provided with sides 35 and 36 which converge in a downward direction. A cross-head 38 having a complementary recess 39 in its lower surface for receiving the sides 35 and 36 of the guide 34, is slidably mounted upon the guide. A bearing block 40 projects upwardly from an intermediate bearing portion of the cross-head 38, and a stub shaft 41 projecting from one side of the block rotatably supports a pulley 42 which is substantially identical to and in alignment with the pulley 21.

The bearing block 40 also is provided with an internally threaded opening 44 which extends parallel to the cross-head 38. A screw 45 threaded through the opening 44 has its opposite ends non-slidably journalled in bearing brackets 46 and 47 projecting upwardly from opposite ends of the block 25. A hand wheel 48 rigidly secured to one end of the screw is provided for rotating the latter. It follows that, upon rotation of the hand wheel 48, the cross-head 38, the bearing block 40 projecting upwardly therefrom, and the pulley 42, may be moved longitudinally in either direction with respect to the block 25. It is apparent that major adjustments of the cross-head 38 with respect to the I-beam 11 may be effected by bodily moving the block 25 longitudinally of the I-beam and that more precise adjustments of the cross-head may be made by rotating the hand wheel 48.

A vertically disposed bar 50, disposed at the same side of the cross-head as the pulley 42, is rigidly secured to the cross-head 38 by means of a horizontally disposed portion 51 on the bar seated upon the upper surface of the cross-head which is rigidly secured to the latter by machine bolts 52. The upper end of the bar 50 is provided with a portion 55 which projects in a horizontal direction over the pulley 42. A pair of spaced pins 56 and 57 projecting downwardly through openings in the portion 57 of the bar 50 are rigidly secured to such portion by nuts 58 and 59 respectively engaging upper and threaded ends of the pins and by collars 60 and 61 engaging the pins and abutting the lower surface of the portion 55 of the bar 50. The lower ends of the pins 56 and 57 rotatably support a pair of vertically disposed rollers 62 and 63, respectively retained on the ends of the pins by collars 64 and 65 engaging the lower ends of the latter. The rollers 62 and 63 are equally spaced from the median plane of the pulley 42.

The lower end of the bar 50 is provided with a portion 67 similar to the portion 55 which supports a pair of upwardly projecting rollers 68 and 69 similar to the rollers 62 and 63. It is apparent that the rollers 62, 63, 68 and 69 provide guideways for directing a belt around the pulley 42 and maintaining it substantially centrally of the edges of the latter.

Adjacent the pulley 21, a standard 70 rigidly secured at its base to the I-beam 11, projects upwardly to a point vertically spaced with respect to the upper surfaces of the pulleys 21 and 22, and is provided with a portion 71 directed substantially horizontally toward the pulley 42. The projecting portion 71 of the standard 70 is provided with pins 72, 73 and 74 equally spaced longitudinally thereof. The pins 72 and 74 are adapted rotatably to support rolls of fabric 75 and 76 while the pin 73 rotatably supports an arm 78 pivotally mounted intermediate its ends thereon. The free ends of the arm 78 are provided with openings 79 and 80 adapted to engage the pins 72 and 74 respectively. The arm 78 is movable bodily along the pin 73 and is resiliently urged toward the portion 71 of the standard 70 by a spring 82 on the pin which abuts the arm 78 and a collar 83 rigidly secured to the outer end of the pin. The pin 73 projects outwardly from the horizontal portion 71 of the standard 70 a greater distance than the pins 72 and 74 project, and hence, by moving the arm 78 toward the outer end of the pin 73, the free ends of the arm may be freed from engagement with the pins 72 and 74. After the arm has thus been disengaged from the pins 72 and 74 it may be turned until it is disposed in a vertical position which permits removal of the rolls of fabric 75 and 76 from the pins 72 and 74.

In building V-belts by winding successively a plurality of strips of fabric and rubber about the pulleys 21 and 42, the rolls 75 and 76 are formed of fabric material of different widths and such rolls are interchanged with other rolls depending upon the width of fabric desired or material which is to be employed. The first strip of fabric wound about the pulleys 21 and 42 is the narrower strip of the V-belt, and it is accurately aligned with the center line of the pulleys by a roller 82 which is rotatably mounted upon the outer end of a rod 83. The opposite end of the rod 83 is provided with a bearing portion 85, which is rotatably mounted upon a bolt 86 projecting through bifurcated portions 87 and 88 of a bracket 89 secured by bolts 90 to the standard 70. When the rod 83 is turned about the bolt 86 until it is aligned with the axis of the pulleys 21 and 42, the roller 82 is aligned with the pulleys and, consequently, constitutes a guide for aligning the strip of fabric with respect to the pulleys. After one or more convolutions of the first strip of fabric are wound about the pulleys 21 and 42, the strip is severed from the roll, and its end is stitched to the fabric already wound about the pulleys.

The second strip of fabric is wound about the pulleys in superposed relation with respect to the first strip of fabric and, in order to guide such strip properly, a mechanism 93 is employed which is illustrated in detail in Fig. 3. This mechanism comprises a bearing bracket 94 rotatably mounted upon a pin 95 projecting through a bearing portion 96 of a bracket 97 secured to the standard 70 by bolts 98. The bracket 94 is provided with a vertically projecting portion 95 terminating in a laterally directed channel 99 that opens downwardly. The free end of the channel 99 is secured by screws 101 to a plate 102 projecting below the legs of the channel. A screw 104 disposed within the channel 99 is journalled in openings in the plate 102 and the upwardly projecting portion 95 of the bracket 94, and is provided with a hand wheel 105 for facilitating its operation. The screw 104 is provided with right hand and left hand threads at opposite sides of its center, upon which blocks 107 and 108 are threaded. These blocks project from opposite sides of the screw in a horizontal direction and substantially contact with the legs of the channel portion 99, which cooperation of parts prevents turning of the blocks when the screw 104 is rotated. The blocks 107 and 108 are provided respectively, with depending bars 109 and 110 for guiding the edges of fabric wound about the pulleys 21 and 42. A roller 112 rotatably mounted upon a bolt 113 extends between the lower ends of the plate 102, the vertically projecting portion 95 of the bearing bracket 94, and through openings in the bars 109 and 110, and constitutes a guide for the upper surface of the fabric as it passes between the bars 109 and 110. Normally, the bracket 94 is maintained in its operative position by a spring 113 secured at its opposite ends, as indicated at 114, to the standard 70 and to the vertically projecting portion 95.

A second guiding mechanism 117 similar to the mechanism 93 is provided adjacent the pulley 42 and is mounted upon a bracket 118 secured by bolts 119 to the bar 50. The mechanisms 118 and 93 are substantially identical with the exception that the first mentioned mechanism is not pivotally mounted in the manner that the mechanism 93 is pivotally mounted upon the pin 95, but is rigidly secured to the bracket 118.

Intermediate the pulleys 21 and 42, a grooved roller 120 is rotatably mounted upon a bracket 121 which is secured by bolts 122 to the I-beam 11. This roller is provided to guide the first strip of fabric about the pulleys 21 and 42 as such fabric moves about the latter pulley and also serves as a guide for retaining the core of the belt during the application of a cover thereto.

The mechanism so far described is employed for assembling the core of a V-belt in the following manner. Initially, the roller 82 is disposed in alignment with the pulleys 21 and 42 and the narrower strip of fabric used is directed about the pulleys 21 and 42 and at the same time the motor 12 is energized causing rotation of the pulley 21. After one convolution of such fabric is wound about the pulleys 21 and 42, it is apparent that both pulleys are rotated by the motor, because of the fact that such convolutions of fabric serve as a belt which extends about the pulleys. As many convolutions of the aforesaid fabric may be wound about the pulleys as are found desirable, and then it is severed from the roll of fabric and its end is stitched to that part previously wound about the pulleys. The second strip of fabric applied is slightly wider than the first strip and the bars 109 and 110 of the guiding mechanism 93 and the corresponding bars of the mechanism 117 are adjusted in such manner that they substantially contact with the edges of the fabric. Rotation of the pulleys 21 and 42 causes the second strip of fabric to be wound about the pulleys in superposed relation with respect to the first strip of fabric applied during this operation and the bars 109 and 110 and the corresponding bars of the mechanism 117 maintain the edges of the fabric symmetric with respect to the center line of the first strip of fabric. As many convolutions of the second fabric as desired may be wound about the pulleys in symmetric relation with respect to the first strip. The second strip is then severed from the corresponding roll of fabric and is stitched to the fabric already wound about the pulleys. Succeeding strips of fabric, or fabric and rubber, progressively varying in width, may be wound about the pulleys in the same manner, and it is apparent that the bars 109 and 110 of the guiding mechanism 93 and the corresponding bars of the mechanism 117, may be adjusted to wind such strips symmetrically with respect to the center line of the strips previously applied. It follows that a core substantially of V-shape may be rapidly and accurately assembled by the use of the machine described.

A woven fabric cover is folded about the core by the following mechanism. Initially, covering material 130 is directed through a channel guideway 131 secured to the I-beam 11 and alternately about upper surfaces and lower surfaces of a plurality of pins 132 projecting through the legs of the guideway, employed for the purpose of applying tension to the fabric as it is conducted to the core. The end of the fabric 130 is stitched to the outer peripheral surface of the core, and then edge portions of the fabric are stitched to the converging sides of the core by the following mechanism. At one side of the framework 10 a guide 133 is rigidly secured to the framework 10 and is provided with a channel 134 having grooves 135 provided in adjacent sides of the legs thereof. A cross-head 136 slidably disposed in the channel 134, is provided with portions 137 disposed in the grooves 135 and hence is maintained in the guideways althrough it is free to be moved vertically therein. The cross-head 136 is moved vertically by a toggle 138 pivotally secured at its upper end to a pin 139 projecting from the cross-head, and at its lower end to a pin 140 projecting from the lower end of the guide member 133. A pin 142 connecting the adjacent ends of the links comprising the toggle 138 is pivotally secured to a bar 143 which in turn at its opposite end is pivotally secured to a handle 144 as indicated at 145. The lower end of the handle is pivoted as indicated at 146 upon the framework 10. It is apparent that by moving the handle 144, the links comprising the toggle 138 may be moved to or out of aligned position, which results in vertical movement of the cross-head 135 to and from operative position with respect to the core.

A roller 147 is rotatably mounted upon a pin 149 projecting through a bifurcated portion 148 of the upper end of the cross-head 136. The upper end of the portion 148 is provided with inclined surfaces 150 into which inclined pins 151 are threaded at their lower ends. Each of these pins rotatably supports a conically faced roller 152 which is maintained against the surface 150 by a spring 153 confined under compression between the roller 152 and a collar 154 loosely disposed upon the pin 151 and retained thereon by an integral head 155 on the outer end of the pin. The adjacent conical faces of the rollers 152 are adapted to contact with the converging sides of the core of the belt for the purpose of stitching the edges of the cover 130 to the sides thereof, while the roller 147 is adapted to stitch the cover to the outer peripheral surface of the core.

The edges of the cover then are folded in overlapping relation upon the inner peripheral surface of the core by a folding device 160 which is shown in detail by Fig. 4. This folding device comprises a plate 161 having an elongate opening 162 and is adjustably secured to the I-beam 11 by a bolt 163 projecting through the opening 162 and threaded into the I-beam. The plate 162 is provided with a portion 164 adapted to fold one edge of the fabric and substantially stitch it to the inner peripheral surface of the core of the belt, and a second portion 165 adapted to fold the other edge of the cover about the inner peripheral surface of the core in overlapping relation with respect to the first edge. The portions 164 and 165 are provided with inclined diagonal portions 166 and 167 which guide the edge portions of the fabric respectively to the inner peripheral surface of the core. In order to maintain the edges of the fabric separated until the first edge of the folded fabric is stitched to the inner peripheral surface of the core, a downwardly projecting bar 170 is provided which is disposed between the edges of the fabric. This bar is secured to the standard 70 by a bolt 171. After the core is thus covered with fabric, the handle 144 is so moved that the rollers 152 are moved downwardly and away from the core, and the belt is then removed and vulcanized.

From the foregoing description, it is apparent that a machine has been provided for efficiently building V-belts, having cores composed of different materials, and that the assembling of a plurality of strips of such materials of varying widths can be made with such precision that the edges of the several strips of material are symmetric with respect to the median plane of the first strip wound about the pulleys of the machine. Also, it is apparent that an efficient means has been provided for folding an elongate strip of fabric about the core, which constitutes the cover therefor. Moreover, V-belts of various lengths and dimensions may be manufactured without interfering with the precision with which the machine operates. In V-belts constructed according to the method disclosed by this invention, and manufactured by the machine provided for that purpose, the respective layers of material constituting the core thereof are disposed in the portions in which they are normally disposed in the finished belt. Hence, final vulcanization of the belt will not substantially change the positions of the respective layers.

Although only the preferred form of the invention has been described and illustrated, it will be apparent to those skilled in the art that the invention is not so limited but that various modifications may be made therein without departing from the spirit of the invention or from the scope of the appended claims.

What I claim is:

1. The method of manufacturing V-belts which comprises winding a plurality of plies of rubberized material varying progressively in width about a plurality of spaced rollers while rotating the latter, applying a woven fabric cover to the core thus formed during its movement by stitching one end of the latter fabric to the core and folding edge portions of the fabric about the core, and finally vulcanizing the assembly.

2. The method of manufacturing V-belts which comprises winding a plurality of plies of rubber and rubberized fabric about a plurality of spaced rollers while rotating the latter, wherein the plies increase progressively in width from the first to the last applied, applying a woven fabric cover to the core thus formed during its movement by stitching one end of the latter fabric to one surface of the core, folding the edges of the fabric about the core, and finally vulcanizing the assembly.

3. The method of manufacturing V-belts which comprises winding a plurality of plies of rubber and rubberized cord fabric about a plurality of spaced rollers while rotating the latter, the plies increasing progressively in width from the first to the last applied, applying a woven fabric cover to the core thus formed during its movement by stitching one end of the latter fabric to one surface of the core and folding the edges of the fabric about the core, and finally vulcanizing the assembly.

4. The method of manufacturing V-belts which comprises winding a plurality of plies of rubberized material varying progressively in width about a plurality of spaced rollers while rotating the latter, with the ends of the several plies distributed in longitudinally spaced relation, applying a woven fabric cover to the core thus formed during its movement by stitching one end of the latter fabric to the core, folding edge portions of the fabric about the core, and finally vulcanizing the assembly.

5. A machine for building V-belts comprising a plurality of spaced rollers, means for winding successively a plurality of plies of rubberized material varying in width about the rollers, means for maintaining the individual plies symmetric with respect to the median plane coinciding with the median line of the ply first applied, and means for applying a cover to the core thus assembled, during movement of the latter about the pulleys.

6. A machine for building V-belts, comprising a plurality of spaced rollers, means for winding successively a plurality of plies of rubberized material varying in width about the rollers, means for maintaining the individual plies symmetric with respect to the median plane coinciding with the median line of the ply first applied, and means for applying a cover to the core thus assembled, during movement of the latter about the pulleys, said last mentioned means including resilient devices for stitching the cover to the sides of the core.

7. A machine for building V-belts, comprising a plurality of spaced rollers, means for winding successively a plurality of plies of rubberized material varying in width about the rollers, means for maintaining the individual plies symmetric with respect to the median plane coinciding with the median line of the ply first applied, and means for applying a cover to the core thus assembled, during movement of the latter about the pulleys, said last mentioned means including resilient devices for stitching the cover to the sides of the core, said devices being so movable to and from the core that they will not interfere with the assembling of the plies comprising the core.

8. A machine for building V-belts comprising a plurality of spaced rollers, means for winding successively a plurality of plies of rubberized material varying in width about the rollers, means for maintaining the individual plies symmetric with respect to the median plane coinciding with the median line of the ply first applied, and means for applying a cover to the core thus assembled, during movement of the latter about the pulleys, said last mentioned means including simultaneously movable resilient devices for stitching the cover to the sides of the core.

9. A machine for building V-belts comprising a plurality of spaced rollers, means for successively supplying a plurality of plies of rubberized material of varying width about the rollers, and adjustable means for guiding the edges of the several plies regardless of their width.

10. A machine for building V-belts comprising a plurality of pairs of alined rollers mounted in the same plane but on individual offset axes, means for successively supplying a plurality of plies of rubberized material of varying width about each pair of the alined rollers, and adjustable means for guiding the edges of the several plies regardless of their width, said means including guiding elements simultaneously and equally adjustable in opposite directions.

11. A machine for building V-belts comprising a plurality of spaced rollers, means for successively supplying a plurality of plies of rubberized material of varying width about the rollers, and adjustable means for guiding the edges of the several plies regardless of their width, said means including a screw having oppositely directed threads, and fabric guiding elements engaging the respective threaded portions.

12. A machine for building V-belts comprising a plurality of spaced rollers, means for successively supplying a plurality of plies of rubberized material of varying width about the rollers, and adjustable means for guiding the edges of the several plies regardless of their width, said means including a screw having oppositely directed threads, guiding elements engaging the respective threaded portions, and a roller journalled in openings in the guiding elements.

13. In a machine for manufacturing belts or similar articles composed of laminated rubberized material, fabric roll supporting means comprising a frame member, spaced roll supporting pins projecting from the frame member, and an arm pivoted upon a pin projecting from the frame member and having means for engaging the ends of the free roll supporting pins in order to maintain the rolls on such pins.

14. A machine for building V-belts comprising a plurality of spaced axially offset, alined rollers, means for successively supplying a plurality of plies of rubberized material of varying width about and between the alined rollers, and means for maintaining the plies symmetric with respect to the median plane coinciding with the ply first applied, said means including a device for guiding the edges of the first ply and an adjustable device for successively contacting with the edges of the remaining plies.

15. A machine for building belts comprising a pair of alined spaced rollers, means for winding successively a plurality of plies of rubberized material about the rollers, means for maintaining the individual plies symmetric with respect to the median line of the ply first applied, and means for applying a cover to the core thus assembled, during movement of the latter about the pulleys.

16. A machine for building belts, comprising a pair of spaced, alined rollers, means for winding successively a plurality of plies of rubberized material about the alined rollers whereby the material is supported between the rollers, means for maintaining the individual plies symmetric with respect to the median line of the ply first applied, and means for applying a cover to the core thus assembled, during movement of the latter about the pulleys, said last mentioned means including resilient devices for stitching the cover to the sides of the core, said devices being so movable to and from the core that they will not interfere with the assembling of the plies comprising the core.

17. Apparatus for building belts or the like, including alined, spaced rotatable members, means adapted to feed a flexible belt producing element around the alined rotatable members so that it is supported therebetween, means to positively aline the flexible element on the rotatable members, means adapted to feed a cover to the flexible element carried between the rotatable members, means for folding the cover around the flexible element, and means for stitching the cover securely in place on the flexible belt producing element.

18. In combination, a frame, a pair of alined rotatable members journaled on said frame, means for moving said rotatable members toward and from each other, said rotatable members being adapted to support an endless flexible element therebetween, means for guiding a web of covering material to the flexible element, means for providing tension in the covering material as it is fed to the flexible element, means for simultaneously applying the covering material to the sides and outer surface of the flexible element, means for folding the covering material around the inner surface of the belt to form an overlapping seam, and means for stitching the overlapping seam of the cover.

19. In combination, a frame, a pair of alined rotatable members journaled on said frame, said rotatable members being adapted to support an endless flexible element therebetween, means for guiding a web of covering material to the flexible element, means for simultaneously applying the covering material to the sides and outer surface of the flexible element, means for folding the covering material around the inner surface of the belt to form an overlapping seam, and means for stitching the overlapping seam of the cover.

WILLIAM H. GERSTENSLAGER.